United States Patent
Shimazu

(10) Patent No.: US 11,807,331 B2
(45) Date of Patent: Nov. 7, 2023

(54) HUMAN-POWERED VEHICLE CONTROL DEVICE

(71) Applicant: Shimano Inc., Osaka (JP)

(72) Inventor: Hayato Shimazu, Osaka (JP)

(73) Assignee: Shimano Inc., Osaka (JP)

( * ) Notice: Subject to any disclaimer, the term of this patent is extended or adjusted under 35 U.S.C. 154(b) by 478 days.

(21) Appl. No.: 17/158,407

(22) Filed: Jan. 26, 2021

(65) Prior Publication Data

US 2021/0237822 A1 Aug. 5, 2021

(30) Foreign Application Priority Data

Feb. 3, 2020 (JP) .................................. 2020-016406

(51) Int. Cl.
| | |
|---|---|
| *B62J 45/20* | (2020.01) |
| *B62J 45/413* | (2020.01) |
| *B62J 45/412* | (2020.01) |
| *B62J 45/411* | (2020.01) |
| *B62J 45/415* | (2020.01) |

(52) U.S. Cl.
CPC ............. *B62J 45/20* (2020.02); *B62J 45/412* (2020.02); *B62J 45/413* (2020.02); *B62J 45/411* (2020.02); *B62J 45/4152* (2020.02)

(58) Field of Classification Search
None
See application file for complete search history.

(56) References Cited

U.S. PATENT DOCUMENTS

2018/0321096 A1* 11/2018 Day ........................ G01L 3/26
2019/0300115 A1* 10/2019 Shahana ................. B62J 45/20

FOREIGN PATENT DOCUMENTS

JP          10-511621 A          11/1998

* cited by examiner

*Primary Examiner* — Timothy Hannon
(74) *Attorney, Agent, or Firm* — Global IP Counselors, LLP

(57) ABSTRACT

A human-powered vehicle control device includes an electronic controller configured to control a transmission that changes a transmission ratio of a rotational speed of a wheel of a human-powered vehicle to a rotational speed of a crank of the human-powered vehicle. The electronic controller is configured to control the transmission to change the transmission ratio in accordance with a comparison of a parameter related to at least one of a traveling environment and a traveling state of the human-powered vehicle with a predetermined determination value. The electronic controller is configured to change the predetermined determination value in accordance with a change in the parameter during a single rotation of the crank.

17 Claims, 5 Drawing Sheets

HUMAN-POWERED VEHICLE CONTROL DEVICE

CROSS-REFERENCE TO RELATED APPLICATIONS

This application claims priority to Japanese Patent Application No. 2020-016406, filed on Feb. 3, 2020. The entire disclosure of Japanese Patent Application No. 2020-016406 is hereby incorporated herein by reference.

BACKGROUND

Technical Field

The present invention generally relates to a human-powered vehicle control device for a human-powered vehicle.

Background Information

Japanese Laid-Open National Phase Patent Publication No. 10-511621 (Patent document 1) discloses one example of a control device for a human-powered vehicle. The control device for a human-powered vehicle described in the patent document 1 controls a transmission in accordance with a predetermined condition and changes a transmission ratio.

SUMMARY

One object of the present invention is to provide a human-powered vehicle control device for a human-powered vehicle that changes the transmission ratio in an optimal manner.

A human-powered vehicle control device for a human-powered vehicle in accordance with a first aspect of the present disclosure comprises an electronic controller configured to control a transmission that changes a transmission ratio of a rotational speed of a wheel of the human-powered vehicle to a rotational speed of a crank of the human-powered vehicle. The electronic controller is configured to control the transmission to change the transmission ratio in accordance with a comparison of a parameter related to at least one of a traveling environment and a traveling state of the human-powered vehicle with a predetermined determination value. The electronic controller is configured to change the predetermined determination value in accordance with a change in the parameter during a single rotation of the crank.

With the human-powered vehicle control device in accordance with the first aspect, the electronic controller is configured to change the predetermined determination value in accordance with a change in the parameter during a single rotation of the crank. Thus, the transmission ratio can be changed in an optimal manner.

In accordance with a second aspect of the present disclosure, in the human-powered vehicle control device according to the first aspect, the electronic controller is configured to change the predetermined determination value in accordance with a change in the parameter during a predetermined first period, and the predetermined first period is shorter than or equal to a period during which the crank rotates one complete revolution.

With the human-powered vehicle control device in accordance with the second aspect, the predetermined determination value is changed in accordance with a change in the parameter in a period during which the crank rotates once.

In accordance with a third aspect of the present disclosure, in the human-powered vehicle control device according to the second aspect, the electronic controller is configured to change the predetermined determination value upon determining a changing rate of the parameter during the predetermined first period is larger than a predetermined first value.

With the human-powered vehicle control device in accordance with the third aspect, the predetermined determination value is changed in a case where the changing rate of the parameter during the predetermined first period is larger than the predetermined first value.

A control device for a human-powered vehicle in accordance with a fourth aspect of the present disclosure comprises an electronic controller configured to control a transmission that changes a transmission ratio of a rotational speed of a wheel of the human-powered vehicle to a rotational speed of a crank of the human-powered vehicle. The electronic controller is configured to control the transmission to change the transmission ratio in accordance with a comparison of a parameter related to at least one of a traveling environment and a traveling state of the human-powered vehicle with a predetermined determination value. The electronic controller is configured to change the predetermined determination value upon determining a changing rate of the parameter during a predetermined first period is larger than a predetermined first value.

With the human-powered vehicle control device in accordance with the fourth aspect, the predetermined determination value is changed in a case where the changing rate of the parameter is larger than the predetermined first value. Thus, the transmission ratio can be changed in an optimal manner.

In accordance with a fifth aspect of the present disclosure, in the human-powered vehicle control device according to the third or fourth aspect, the electronic controller is configured to change the predetermined determination value upon determining a changing rate of the parameter during the predetermined first period is smaller than a predetermined second value.

With the human-powered vehicle control device in accordance with the fifth aspect, the predetermined determination value is changed in a case where the changing rate of the parameter is smaller than the predetermined second value.

In accordance with a sixth aspect of the present disclosure, in the human-powered vehicle control device according to any one of the third to fifth aspects, the electronic controller is configured to decrease the predetermined determination value upon determining the changing rate of the parameter during the predetermined first period is larger than the predetermined first value.

With the human-powered vehicle control device in accordance with the sixth aspect, the predetermined determination value is decreased in a case where the changing rate of the parameter is larger than the predetermined first value.

In accordance with a seventh aspect of the present disclosure, in the human-powered vehicle control device according to the fifth aspect, the electronic controller is configured to increase the predetermined determination value upon determining the changing rate of the parameter during the predetermined first period is smaller than the predetermined second value.

With the human-powered vehicle control device in accordance with the seventh aspect, the predetermined determination value is increased in a case where the changing rate of the parameter is smaller than the predetermined second value.

In accordance with an eighth aspect of the present disclosure, the human-powered vehicle control device according to any one of the second to seventh aspects is configured so that the predetermined determination value includes a first determination value and a second determination value that is larger than the first determination value.

With the human-powered vehicle control device in accordance with the eighth aspect, at least one of the first determination value and the second determination value is changed.

In accordance with a ninth aspect of the present disclosure, in the human-powered vehicle control device according to the eighth aspect, the electronic controller is configured to control the transmission to decrease the transmission ratio upon determining the predetermined parameter is smaller than the first determination value.

With the human-powered vehicle control device in accordance with the ninth aspect, the predetermined determination value is decreased in a case where the changing rate of the parameter is smaller than the first determination value.

In accordance with a tenth aspect of the present disclosure, in the human-powered vehicle control device according to the eighth or ninth aspect, the electronic controller is configured to control the transmission to increase the transmission ratio upon determining the predetermined parameter is larger than the second determination value.

With the human-powered vehicle control device in accordance with the tenth aspect, the transmission ratio is increased in a case where the predetermined parameter is larger than the second determination value.

In accordance with an eleventh aspect of the present disclosure, in the human-powered vehicle control device according to any one of the second to tenth aspects, the electronic controller is configured to change the predetermined determination value in accordance with a changing rate of the parameter during the predetermined first period.

With the human-powered vehicle control device in accordance with the eleventh aspect, the predetermined determination value is changed in accordance with a changing rate of the parameter during the predetermined first period.

In accordance with a twelfth aspect of the present disclosure, the human-powered vehicle control device in accordance with any one of the second to eleventh aspects is configured so that a changing rate of the parameter during the predetermined first period includes a variance value of a plurality of the parameter detected during the predetermined period.

With the human-powered vehicle control device in accordance with the twelfth aspect, the predetermined determination value is changed in accordance with the variance value of a plurality of the parameter detected during the predetermined period.

In accordance with a thirteenth aspect of the present disclosure, in the human-powered vehicle control device according to any one of the first to twelfth aspects, the electronic controller is configured not to change the predetermined determination value in accordance with a changing rate of the predetermined parameter upon determining a predetermined second period has not elapsed from when the human-powered vehicle started traveling.

With the human-powered vehicle control device in accordance with the thirteenth aspect, a change in the parameter is not reflected on the predetermined determination value until the predetermined second period elapses from when the human-powered vehicle starts traveling.

In accordance with a fourteenth aspect of the present disclosure, in the human-powered vehicle control device according to any one of the first to thirteenth aspects, the electronic controller is configured not to change the predetermined determination value in accordance with a changing rate of the predetermined parameter upon determining an inclination angle of the human-powered vehicle is changed by a predetermined angle or greater.

With the human-powered vehicle control device in accordance with the fourteenth aspect, a change in the parameter is not reflected on the predetermined determination value in a case where the inclination angle of the human-powered vehicle is changed by the predetermined angle or greater.

In accordance with a fifteenth aspect of the present disclosure, in the human-powered vehicle control device according to any one of claims first to fourteenth aspects, the electronic controller is configured not to change the predetermined determination value in accordance with a changing rate of the predetermined parameter upon determining a vehicle speed of the human-powered vehicle is less than or equal to a predetermined vehicle speed.

With the human-powered vehicle control device in accordance with the fifteenth aspect, a change in the parameter is not reflected on the predetermined determination value in a case where the vehicle speed of the human-powered vehicle is less than or equal to the predetermined vehicle speed.

In accordance with a sixteenth aspect of the present disclosure, in the human-powered vehicle control device according to any one of the first to fifteenth aspects, the electronic controller is configured not to change the predetermined determination value in accordance with a changing rate of the predetermined parameter upon determining a predetermined third period has not elapsed from when the transmission was controlled to change the transmission ratio.

With the human-powered vehicle control device in accordance with the sixteenth aspect, a change in the parameter is not reflected on the predetermined determination value in a case where the predetermined third period has not elapsed from when the transmission was controlled to change the transmission ratio.

In accordance with a seventeenth aspect of the present disclosure, the human-powered vehicle control device according to any one of the first to sixteenth aspects is configured so that the parameter includes a rotational speed of the crank.

With the human-powered vehicle control device in accordance with the seventeenth aspect, the predetermined determination value is changed in accordance with the rotational speed of the crank.

The human-powered vehicle control device for a human-powered vehicle in accordance with the present disclosure changes the transmission ratio in an optimal manner.

BRIEF DESCRIPTION OF THE DRAWINGS

Referring now to the attached drawings which form a part of this original disclosure.

DETAILED DESCRIPTION OF EMBODIMENTS

Figure 1:
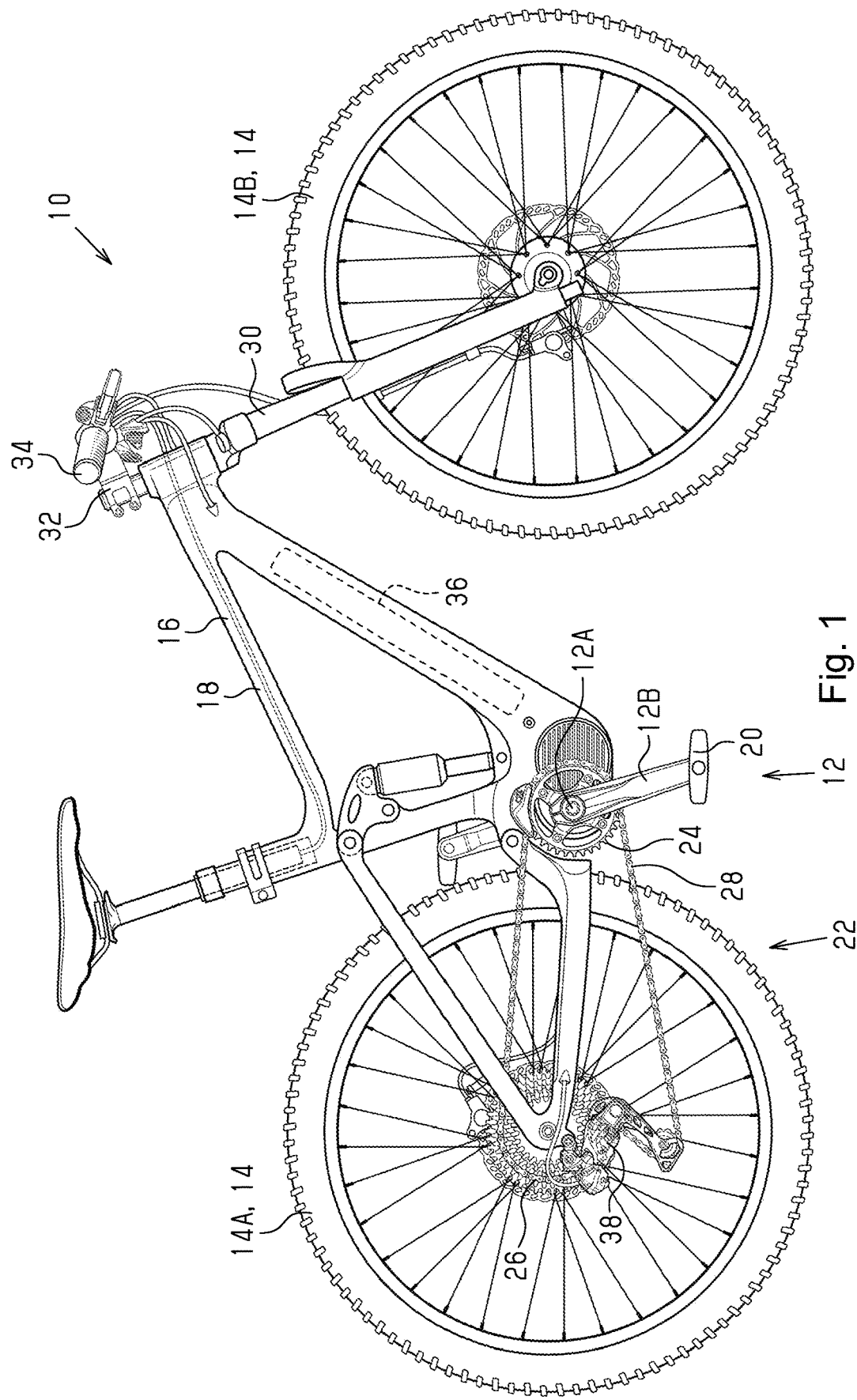
FIG. 1 is a side elevational view of a human-powered vehicle including a human-powered vehicle control device in accordance with one embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

EMBODIMENT

A human-powered vehicle control device 50 for a human-powered vehicle in accordance with one embodiment will now be described with reference to FIGS. 1 to 6. The human-powered vehicle 10 is a vehicle that includes at least one wheel and is driven by at least a human driving force H. The human-powered vehicle 10 includes, for example, various types of bicycles such as a mountain bike, a road bike, a city bike, a cargo bike, a handcycle, and a recumbent bike. The number of wheels of the human-powered vehicle 10 is not limited. The human-powered vehicle 10 includes, for example, a monocycle and vehicles having three or more wheels. The human-powered vehicle 10 is not limited to a vehicle driven only by a human driving force H. The human-powered vehicle 10 includes an e-bike that uses not only a human driving force H but also drive force of an electric motor for propulsion. An e-bike includes an electric assist bicycle that assists in propulsion of the vehicle with an electric motor. In the embodiments described below, the human-powered vehicle 10 refers to a bicycle.

The human-powered vehicle 10 includes a crank 12 to which the human driving force H is input. The human-powered vehicle 10 further includes a pair of wheels 14 and a body 16. The wheels 14 include a rear wheel 14A and a front wheel 14B. The body 16 includes a frame 18. The crank 12 includes a crank axle 12A, which is rotatable relative to the frame 18, and two crank arms 12B, which are respectively provided on the axial ends of the crank axle 12A. A pedal 20 is coupled to each of the crank arms 12B. The crank 12 is rotated to drive the rear wheel 14A. The rear wheel 14A is supported by the frame 18. The crank 12 is linked to the rear wheel 14A by a drive mechanism 22. The drive mechanism 22 includes a first rotational body 24 coupled to the crank axle 12A. The crank axle 12A and the first rotational body 24 can be coupled to rotate integrally with each other. Alternatively, the crank axle 12A and the first rotational body 24 can be coupled to each other by a first one-way clutch. The first one-way clutch is configured to rotate the first rotational body 24 forward in a case in which the crank 12 is rotated forward and permit relative rotation of the crank 12 and the first rotational body 24 in a case in which the crank 12 is rotated backward. The first rotational body 24 includes a sprocket, a pulley, or a bevel gear. The drive mechanism 22 further includes a second rotational body 26 and a linking member 28. The linking member 28 transmits the rotational force of the first rotational body 24 to the second rotational body 26. The linking member 28 includes, for example, a chain, a belt, or a shaft.

The second rotational body 26 is coupled to the rear wheel 14A. The second rotational body 26 includes a sprocket, a pulley, or a bevel gear. Preferably, a second one-way clutch is provided between the second rotational body 26 and the rear wheel 14A. The second one-way clutch is configured to rotate the rear wheel 14A forward in a case where the second rotational body 26 is rotated forward and permit relative rotation of the second rotational body 26 and the rear wheel 14A in a case where the second rotational body 26 is rotated backward.

The front wheel 14B is attached to the frame 18 by a front fork 30. A handlebar 34 is coupled to the front fork 30 by a stem 32. In the present embodiment, the rear wheel 14A is linked to the crank 12 by the drive mechanism 22. However, at least one of the rear wheel 14A and the front wheel 14B can be linked to the crank 12 by the drive mechanism 22.

Preferably, the human-powered vehicle 10 further includes a battery 36. The battery 36 includes one or more battery elements. The battery elements include rechargeable batteries. The battery 36 is configured to supply electric power to the human-powered vehicle control device 50. Preferably the battery 36 is connected to an electronic controller 52 of the control device 50 in a manner allowing for wired communication or wireless communication. The battery 36 is connected by, for example, power line communication (PLC), Controller Area Network (CAN), or Universal Asynchronous Receiver-Transmitter (UART) to the electronic controller 52 in a manner allowing for communication.

The human-powered vehicle 10 includes a transmission 38. The transmission 38 changes the transmission ratio R of the human-powered vehicle 10 that is the rotational speed NW of the wheel 14 to the rotational speed N of the crank 12. The transmission ratio R is the ratio of the rotational speed of the drive wheel to the rotational speed N of the crank 12. In the present embodiment, the drive wheel is the rear wheel 14A. The transmission 38 includes, for example, at least one of a front derailleur, a rear derailleur, and an internal-gear hub. In a case where the transmission 38 includes an internal-gear hub, for example, the hub of the rear wheel 14A is provided with the internal-gear hub. The transmission 38 is configured to be driven by an actuator 38A. The actuator 38A includes, for example, an electric actuator. The actuator 38A includes, for example, an electric motor.

Figure 2:
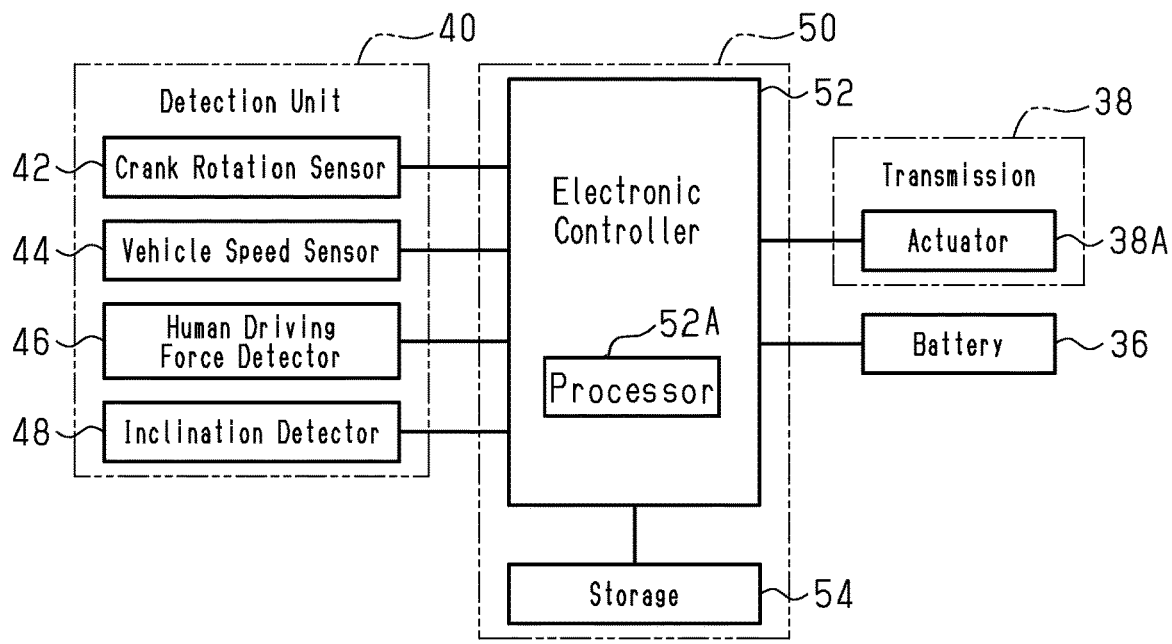
FIG. 2 is a block diagram showing the electrical configuration of the human-powered vehicle including the human-powered vehicle control device in accordance with the embodiment.

The human-powered vehicle control device 50 includes the electronic controller 52. The electronic controller 52 includes at least one processor 52A that executes a predetermined control program. The processor 52A includes, for example, a central processing unit (CPU) or a micro-processing unit (MPU). The term "electronic controller" as used herein refers to hardware that executes a software program, and does not include a human. For the sake of brevity, the electronic controller 52 shall hereinafter be simply referred to as "the controller 52". The processor 52A includes, for example, an arithmetic processing unit. While only one processor is illustrated in FIG. 2, it will be apparent from this disclosure that several processors can be used. When several processors are used, the processors can be provided at a plurality of separate positions. The controller 52 can include one or more microcomputers. Preferably, the human-powered vehicle control device 50 further includes storage 54. The storage 54 stores information used for various control programs and various control processes. The storage 54 includes any computer storage device or any non-transitory computer-readable medium with the sole exception of a transitory, propagating signal. For example, the storage 74 includes a nonvolatile memory and a volatile memory. The nonvolatile memory includes, for example, at least one of a read-only memory (ROM), an erasable programmable read-only memory (EPROM), an electrically erasable programmable read-only memory (EEPROM), and a flash memory. The nonvolatile memory includes, for example, a random access memory (RAM).

Preferably, the human-powered vehicle 10 further includes a detection unit 40. The detection unit 40 detects a parameter P that is related to at least one of the traveling environment and the traveling state of the human-powered vehicle 10. The parameter P includes, for example, the rotational speed N of the crank 12. The parameter P can include the vehicle speed V of the human-powered vehicle 10. The parameter P can include the human driving force H input to the human-powered vehicle 10. In a case where the parameter P includes the rotational speed N of the crank 12, the detection unit 40 includes a crank rotation sensor 42. In a case where the parameter P includes the vehicle speed V, the detection unit 40 includes a vehicle speed sensor 44. In a case where the parameter P includes the human driving force H, the detection unit 40 includes a human driving force detector 46. In a case where the parameter P includes an inclination angle A, the detection unit 40 includes an inclination detector 48. The term "sensor" as used herein also refers to a hardware device or instrument designed to detect the presence of a particular object or substance and to emit a signal in response. The term "sensor" as used herein also do not include a human. Likewise, the term "detector" as used herein refers to a hardware device or instrument designed to detect the presence of a particular object or substance and to emit a signal in response. The term "detector" as used herein do not include a human.

Preferably, the detection unit 40 is configured to detect the parameter P twice during a predetermined period TA. The predetermined period TA is, for example, the period during which the crank 12 rotates once, the period during which the wheel 14 rotates once, or a predetermined time TB. The predetermined time TB is set to be a time shorter than the time during which the crank 12 rotates once in a case where a typical rider is driving the human-powered vehicle 10 on a level road. The detection unit 40 can be configured to detect the parameter P once during the predetermined period TA.

The crank rotation sensor 42 is configured to detect information corresponding to the rotational speed N of the crank 12. The crank rotation sensor 42 is provided on, for example, the frame 18 of the human-powered vehicle 10. The crank rotation sensor 42 includes a magnetic sensor that outputs a signal corresponding to the magnetic field intensity. An annular magnet of which the magnetic field intensity varies in the circumferential direction is provided on the crank axle 12A, a member rotated in cooperation with the crank axle 12A, or in a power transmission path extending from the crank axle 12A to the first rotational body 24. The crank rotation sensor 42 outputs a signal corresponding to the rotational speed N of the crank 12. The magnet can be provided on a member rotated integrally with the crank axle 12A in a power transmission path of the human driving force H extending from the crank axle 12A to the first rotational body 24. For example, in a case where a first one-way clutch is not provided between the crank axle 12A and the first rotational body 24, the magnet can be provided on the first rotational body 24. Instead of the magnetic sensor, the crank rotation sensor 42 can include an optical sensor, an acceleration sensor, a gyro sensor, or a torque sensor. The crank rotation sensor 42 is connected to the controller 52 by a wireless communication device or an electric cable. Preferably, the crank rotation sensor 42 is configured to output a predetermined number of detection signals during a single rotation (one complete revolution) of the crank 12. The predetermined number is, for example, two or greater. Preferably, the predetermined number is four or greater. Preferably, the predetermined number is a multiple of four. Preferably, the predetermined number is eight, twelve, or sixteen. The crank rotation sensor 42 can include a vehicle speed sensor. In a case where the crank rotation sensor 42 includes a vehicle speed sensor, the controller 52 is configured to, for example, calculate the rotational speed N of the crank 12 from the vehicle speed detected by the vehicle speed sensor and the transmission ratio R.

The vehicle speed sensor 44 is configured to detect information corresponding to the rotational speed NW of the wheel 14 of the human-powered vehicle 10. The vehicle speed sensor 44 is configured to detect, for example, a magnet provided on the wheel 14 of the human-powered vehicle 10. The vehicle speed sensor 44 outputs a signal corresponding to the rotational speed NW of the wheel 14. The controller 52 can calculate the vehicle speed V of the human-powered vehicle 10 from the rotational speed NW of the wheel 14 and information related to the circumferential length of the wheel 14. The storage 54 stores information related to the circumferential length of the wheel 14. The vehicle speed sensor 44 includes, for example, a magnetic reed, which forms a reed switch, or a Hall element. The vehicle speed sensor 44 can be attached to a chain stay of the frame 18 of the human-powered vehicle 10 and configured to detect a magnet attached to the rear wheel 14A. Alternatively, the vehicle speed sensor 44 can be provided on the front fork 30 to detect a magnet attached to the front wheel 14B. The vehicle speed sensor 44 does not have to be configured to detect a magnet provided on the wheel 14 and may be formed by, for example, an optical sensor. The vehicle speed sensor 44 is connected to the controller 52 by a wireless communication device or an electric cable. Preferably, the vehicle speed sensor 44 is configured to output, for example, a predetermined number of detection signals during a single rotation of the wheel 14. The predetermined number is, for example, two or greater. Preferably, the predetermined number is four or greater. Preferably, the predetermined number is a multiple of four. Preferably, the predetermined number is eight, twelve, or sixteen. In the predetermined embodiment, the vehicle speed sensor 44 is configured so that a reed switch detects a magnet twice during a single rotation of the wheel 14.

The human driving force detector 46 includes, for example, a torque sensor. The torque sensor is configured to output a signal corresponding to the torque applied to the crank 12 by the human driving force H. Preferably, in a case where, for example, the first one-way clutch is provided in the power transmission path, the torque sensor is provided in the power transmission path at an upstream side of the first one-way clutch. The torque sensor includes a strain sensor, a magnetostrictive sensor, or a pressure sensor. The strain sensor includes a strain gauge. The torque sensor is provided in the power transmission path or in the vicinity of a member included in the power transmission path. The member included in the power transmission path is, for example, the crank axle 12A, a member that transmits the human driving force H between the crank axle 12A and the first rotational body 24, the crank arms 12B, or the pedals 20. The torque sensor is connected to the controller 52 by a wireless communication device or an electric cable. The human driving force detector 46 can include, for example, a sensor that detects the pressure applied to the pedals 20 or a sensor that detects the tension of the chain as long as information related to the human driving force H can be obtained. Preferably, the torque sensor is configured to output a predetermined number of detection signals during a single rotation of the crank 12. The predetermined number is, for example, two or greater. Preferably, the predetermined number is four or greater. Preferably, the predetermined number is a multiple of four. Preferably, the predetermined number is eight, twelve, or sixteen.

The inclination detector 48 is configured to detect the inclination angle A of the road surface on which the human-powered vehicle 10 is traveling. The inclination angle A of the road surface on which the human-powered vehicle 10 is traveling can be detected as the inclination angle relative to the traveling direction of the human-powered vehicle 10. The inclination angle A of the road surface on which the human-powered vehicle 10 is travelling corresponds to the inclination angle of the human-powered vehicle 10. In one example, the inclination detector 48 includes an inclination sensor. In one example, the inclination sensor includes a gyro sensor or an acceleration sensor. In another example, the inclination detector 48 includes a Global Positioning System (GPS) receiver. The controller 52 can calculate the inclination angle A of the road surface on which the human-powered vehicle 10 is traveling from GPS information obtained by the GPS receiver and the road gradient included in map information stored in advance in the storage 54. The inclination detector 48 is connected to the controller 52 by a wireless communication device or an electric cable. Preferably, the inclination detector 48 is configured to output a predetermined number of detection signals during the predetermined time TB. The predetermined number is, for example, two or greater. Preferably, the predetermined number is four or greater. Preferably, the predetermined number is a multiple of four. Preferably, the predetermined number is eight, twelve, or sixteen.

The controller 52 is configured to control the transmission 38. The controller 52 is configured to control the transmission 38 to change the transmission ratio R in accordance with a comparison of a parameter P related to at least one of the traveling environment and the traveling state of the human-powered vehicle 10 with a predetermined determination value Q.

Preferably, the determination value Q includes a first determination value Q1 and a second determination value Q2 that is larger than the first determination value Q1. The controller 52 controls the transmission 38 so that, for example, the parameter P is included in a range of greater than or equal to the first determination value Q1 and less than or equal to the second determination value Q2.

The controller 52 is configured to control the transmission 38 so that, for example, the transmission ratio R decreases in a case where a predetermined parameter P is less than the first determination value Q1. The controller 52 is configured to control the transmission 38 so that, for example, the transmission ratio R increases upon determining the predetermined parameter P is greater than the second determination value Q2. In this case, if the predetermined parameter P is a parameter P that decreases in a case where the load on the rider is large, the transmission 38 is controlled so that the predetermined parameter P is included in the range of greater than or equal to the first determination value Q1 and less than or equal to the second determination value Q2. Examples of the parameter P that decreases in a case where the load on the rider is large include the rotational speed N of the crank 12 and the vehicle speed V. In this case, if the predetermined parameter P is a parameter P that increases in a case where the load on the rider is large, the transmission ratio R can be changed as intended by the rider if, for example, the load is increased to travel at a high speed, such as during a sprint, or the load is decreased to stop the human-powered vehicle 10. Examples of the parameter P that increases in a case where the load on the rider is large include the human driving force H and the inclination angle A.

Figure 3:
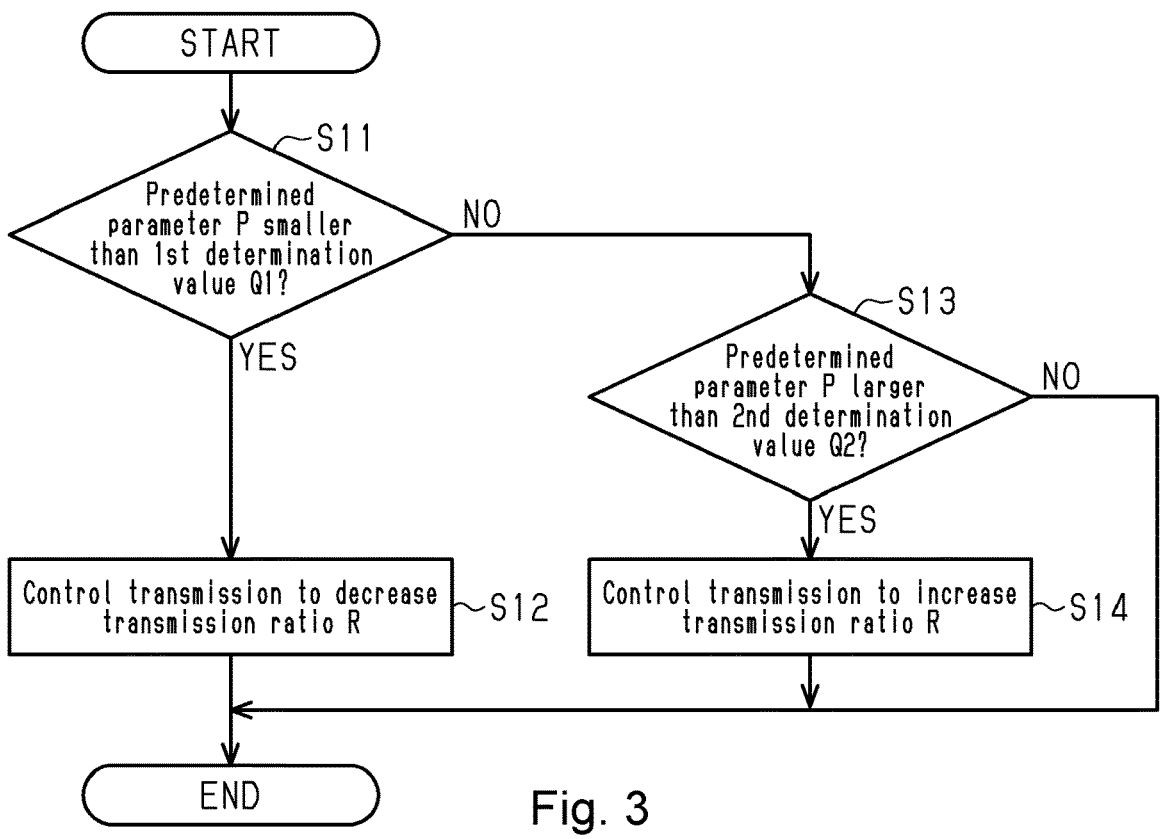
FIG. 3 is a flowchart of a process executed by an electronic controller shown in FIG. 2 to control a transmission in accordance with a determination value.

A process for controlling the transmission 38 will now be described with reference to FIG. 3. In a case where the controller 52 is supplied with electric power, the controller 52 starts the process and proceeds to step S11 of the flowchart illustrated in FIG. 3. Upon completion of the flowchart illustrated in FIG. 3, the controller 52 repeats the process from step S11 in predetermined cycles until the supply of electric power is stopped.

In step S11, the controller 52 determines whether the predetermined parameter P is smaller than the first determination value Q1. More specifically, the controller 52 determines whether the rotational speed N of the crank 12 is lower than the first determination value Q1. In a case where the predetermined parameter P is smaller than the first determination value Q1, the controller 52 proceeds to step S12. In step S12, the controller 52 controls the transmission 38 to decrease the transmission ratio R and then ends the process. In a case where, for example, the present transmission ratio R is the minimum in step S12, the controller 52 ends the process without changing the transmission ratio R.

In a case where the predetermined parameter P is not smaller than the first determination value Q1 in step S11, the controller 52 proceeds to step S13. In step S13, the controller 52 determines whether the predetermined parameter P is larger than the second determination value Q2. More specifically, the controller 52 determines whether the rotational speed N of the crank 12 is higher than the second determination value Q2. In a case where the predetermined parameter P is larger than the second determination value Q2, the controller 52 proceeds to step S14. In step S14, the controller 52 controls the transmission 38 to increase the transmission ratio R and then ends the process. In a case where, for example, the present transmission ratio R is the maximum in step S14, the controller 52 ends the process without changing the transmission ratio R.

In a case where the predetermined parameter P is not larger than the second determination value Q2 in step S13, the controller 52 ends the process.

Figure 4:
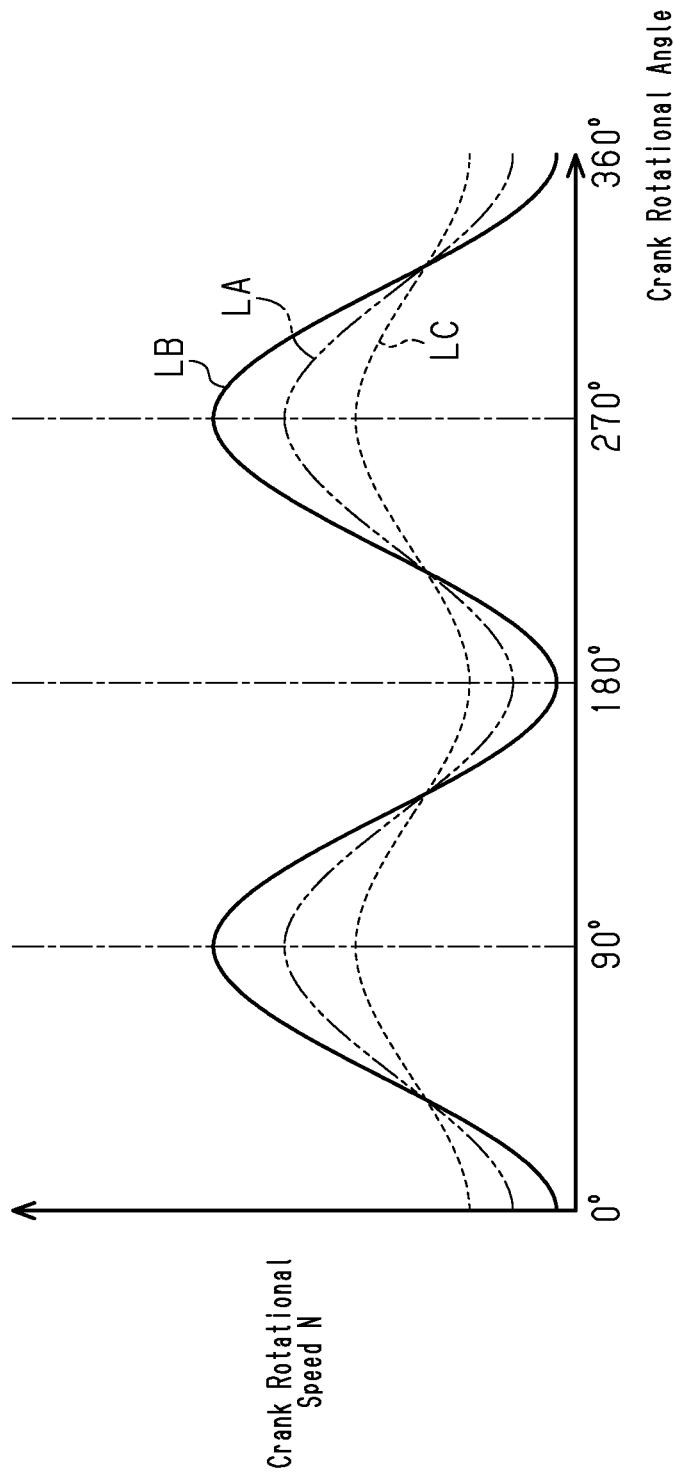
FIG. 4 is a graph showing the relationship of the transmission ratio and the crank rotational speed.

The double-dashed line LA in FIG. 4 shows the relationship of the rotational angle of the crank 12 and the rotational speed of the crank 12 in a case where the optimum transmission ratio R for the rider is selected. As shown by the double-dashed line LA, the rotational speed N of the crank 12 becomes the minimum rotational speed at the top dead center and the bottom dead center, and the rotational speed N of the crank 12 becomes the maximum speed at positions advanced by ninety degrees from the top dead center and the bottom dead center. Even when the transmission ratio R is the optimum for the rider, a difference between the maximum rotation speed and the minimum rotation speed is produced during a single rotation of the crank 12, and the rotational speed N of the crank 12 will include the optimum variation. The solid line LB of FIG. 4 shows the relationship of the rotational angle of the crank 12 and the rotational speed of the crank 12 in a case where the selected transmission ratio R is smaller than the optimum transmission ratio R for the rider. The broken line LC of FIG. 4 shows the relationship of the rotational angle of the crank 12 and the rotational speed of the crank 12 in a case where the selected transmission ratio R is larger than the optimum transmission ratio R for the rider. If the transmission ratio R is smaller than a case where the optimum transmission ratio R for the rider is selected, the difference between the maximum speed and the minimum speed of the rotational speed N of the crank 12 during a single rotation of the crank 12 has an increasing tendency. This increases the variation. If the transmission ratio R is larger than a case where the optimum transmission ratio R for the rider is selected, the difference between the maximum speed and the minimum speed of the rotational speed N of the crank 12 during a single rotation of the crank 12 has a decreasing tendency. This decreases the variation. Even if the parameter P is related to a riding load on the rider other than the rotational speed N of the crank 12, the variation becomes larger than the preferred variation in a case where the selected transmission ratio R is smaller than the optimum transmission ratio R for the rider, and the variation becomes smaller than the preferred variation in a case where the selected transmission ratio R is larger than the optimum transmission ratio R for the rider.

The controller 52 is configured to change the determination value Q in accordance with a change in the parameter P during a single rotation of the crank 12. Preferably, the controller 52 is configured to change the determination value Q in accordance with a change in the parameter P during a predetermined first period T1, where the predetermined first period T1 is a period TX during which the crank 12 rotates once. Preferably, the controller 52 changes the determination value Q in accordance with a changing rate D of the parameter P during the predetermined first period T1. Preferably, the controller 52 changes the determination value Q to change the transmission ratio R so that the variation in the parameter P is included in a predetermined range PX.

Preferably, the changing rate D of the parameter P during the predetermined first period T1 includes a variance value of a plurality of the parameter P that is detected during the predetermined period TX. Preferably, the changing rate D includes the mean value of the variance value of a plurality of the parameter P detected during the period TX. For example, the controller 52 stores the plurality of the parameter P detected by the detection unit 40 in the storage 54. For example, with the parameter P stored a multiple number of times in the storage 54, the controller 52 uses the parameter P obtained during the predetermined first period T1 to calculate the variance values. Among the plurality of the parameter P stored in the storage 54, the controller 52 can use a predetermined number of the plurality of the parameter P to calculate the variance value. In a case where, for example, the newest parameter P is stored in the storage 54, the controller 52 sets recent ones of the plurality of the parameter P including the newest parameter P as the plurality of the parameter P for calculating the variance value. Preferably, the parameter P used to calculate the variance value includes the plurality of the parameter P detected in the period TX during which the crank 12 rotates once.

Figure 5:
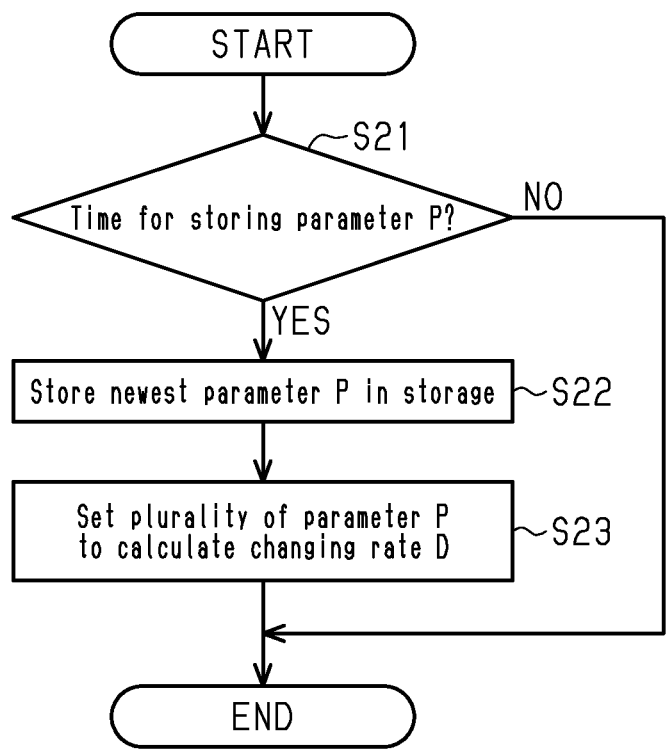
FIG. 5 is a flowchart of a process executed by the electronic controller of FIG. 2 to set a plurality of a parameter to calculate a changing ratio.

A process for setting the parameter P used to calculate the changing rate D will now be described with reference to FIG. 5. In a case where the controller 52 is supplied with electric power, the controller 52 starts the process and proceeds to step S21 of the flowchart illustrated in FIG. 5. Upon completion of the flowchart illustrated in FIG. 5, the controller 52 repeats the process from step S21 in predetermined cycles until the supply of electric power is stopped.

In step S21, the controller 52 determines whether the time for storing the parameter P has come. The controller 52 determines, for example, whether the time for storing the parameter P has come in accordance with a predetermined control cycle. The predetermined control cycle is, for example, equal to the detection cycle of the parameter P of the detection unit 40. In a case where the time for storing the parameter P has not come, the controller 52 ends the process. In a case where the time for storing the parameter P has come, the controller 52 proceeds to step S22. In step S22, the controller 52 stores the parameter P in the storage 54 and then proceeds to step S23. The newest parameter P is, for example, the parameter P included the most recent signal output from the detection unit 40. In step S23, the controller 52 sets the plurality of the parameter P for calculating the changing rate D and then ends the process. For example, in a case where the number of the plurality of the parameter P stored in the storage 54 from when the human-powered vehicle 10 started traveling is less than or equal to a predetermined number, the controller 52 sets every one of the parameter P stored in the storage 54 from when the human-powered vehicle 10 started traveling as the plurality of the parameter P for calculating the changing rate D. For example, in a case where the number of the plurality of the parameter P stored in the storage 54 from when the human-powered vehicle 10 started traveling is greater than the predetermined number, the controller 52 sets a predetermined number of the plurality of the parameter P from the newer ones beginning with the newest parameter P as the plurality of the parameter P for calculating the changing rate D. Preferably, in a case where the human-powered vehicle 10 stops traveling, the controller 52 deletes the stored parameter P from the storage 54. Preferably, the parameter P is stored in a volatile memory. Preferably, in a case where the number of the plurality of the parameter P stored in the storage 54 is greater than the predetermined number, the controller 52 deletes the ones of the parameter P that are not used for calculation of the changing rate D from the storage 54.

Preferably, in a case where the changing rate D of the parameter P during the predetermined first period T1 is larger than a predetermined first value D1, the controller 52 is configured to change the predetermined determination value Q. Preferably, in a case where the changing rate D of the parameter P during the predetermined first period T1 is smaller than a predetermined second value D2, the controller 52 is configured to change the predetermined determination value Q. Preferably, the first value D1 is larger than the second value D2. In a case where the determination value Q includes the first determination value Q1 and the second determination value Q2, if the determination value Q is changed, the controller 52 changes at least one of the first determination value Q1 and the second determination value Q2. In a case where the determination value Q includes the first determination value Q1 and the second determination value Q2, preferably, the controller 52 changes both of the first determination value Q1 and the second determination value Q2. The predetermined first value D1 is stored in advance in the storage 54. The predetermined first value D1 is set to a value that is suitable for the travel of the human-powered vehicle 10 and determined in advance through experiments or the like. The predetermined first value D1 can be stored in the storage 54 in a changeable manner. The predetermined second value D2 is stored in advance in the storage 54. The predetermined second value D2 is set to a value that is suitable for travel of the human-powered vehicle 10 and determined in advance through experiments or the like. The predetermined second value D2 can be stored in the storage 54 in a changeable manner. In a case where the changing rate D is the variance value of the plurality of the parameter P, the predetermined first value D1 is, for example, greater than or equal to 45 and less than or equal to 50. In a case where the changing rate D is the variance value of the plurality of the parameter P, the predetermined second value D2 is, for example, greater than or equal to 20 and less than or equal to 25.

Preferably, the controller 52 is configured to decrease the predetermined determination value Q upon determining the changing rate D of the parameter P during the predetermined first period T1 is larger than the predetermined first value D1. The controller 52 decreases the first determination value Q1 upon determining the changing rate D is larger than the predetermined first value D1. The controller 52 decreases the second determination value Q2 upon determining the changing rate D is larger than the predetermined first value D1.

Preferably, the controller 52 is configured to increase the predetermined determination value Q upon determining the changing rate D of the parameter P during the predetermined first period T1 is smaller than the predetermined second value D2. The controller 52 increases the first determination value Q1 upon determining the changing rate D is smaller than the predetermined second value D2. The controller 52 increases the second determination value Q2 upon determining the changing rate D is larger than the predetermined second value D2.

Preferably, the controller 52 changes and decreases the predetermined determination value Q by a first change amount QX upon determining the changing rate D is larger than the predetermined first value D1 and changes and increases the predetermined determination value Q by a second change amount QY upon determining the changing rate D is smaller than the predetermined second value D2. Preferably, the first change amount QX differs from the second change amount QY. Preferably, the first change amount QX is larger than the second change amount QY. The first change amount QX is set to be greater than the second change amount QY so that the transmission ratio R does not increase easily.

Preferably, the controller 52 is configured to change the predetermined determination value Q in accordance with the changing rate D of the parameter P during the predetermined first period T1. For example, the controller 52 is configured to change the determination value Q so that the change amount of the determination value Q increases as the changing rate D increases. For example, the controller 52 is configured to change the first determination value Q1 so that the first determination value Q1 increases as the changing rate D increases. For example, the controller 52 is configured to change the second determination value Q2 so that the second determination value Q2 increases as the changing rate D increases. For example, the controller 52 is configured to change the first determination value Q1 so that the first determination value Q1 decreases as the changing rate D decreases. For example, the controller 52 is configured to change the second determination value Q2 so that the second determination value Q2 decreases as the changing rate D decreases.

Preferably, the controller 52 is configured not to change the determination value Q upon determining the traveling state of the human-powered vehicle 10 results in a state in which the variation in the parameter P does not stabilize. A state in which the variation in the parameter P does not stabilize includes, for example, at least one of a case where the inclination angle A of the human-powered vehicle 10 is changed by a predetermined angle AX or greater from when the human-powered vehicle 10 starts traveling to when a predetermined second period T2 elapses, a case where the vehicle speed V of the human-powered vehicle 10 is less than or equal to the predetermined vehicle speed VX, and a case where a predetermined third period T3 has not elapsed from when the transmission 38 was controlled to change the transmission ratio R.

Preferably, the controller 52 is configured not to change the determination value Q in accordance with the changing rate D of the predetermined parameter P upon determining the predetermined second period T2 has not elapsed from when the human-powered vehicle 10 started traveling.

Preferably, the controller 52 is configured not to change the determination value Q in accordance with the changing rate D of the predetermined parameter P is a case where the inclination angle A of the human-powered vehicle 10 is changed by the predetermined angle AX or greater.

Preferably, the controller 52 is configured not to change the determination value Q in accordance with the changing rate D of the predetermined parameter P upon determining the vehicle speed V of the human-powered vehicle 10 is less than or equal to the predetermined vehicle speed VX. The predetermined vehicle speed VX is, for example, 13 kilometers per hour.

Preferably, the controller 52 is configured not to change the determination value in accordance with the changing rate D of the predetermined parameter P upon determining the predetermined third period T3 has not elapsed from when the transmission 38 was controlled to change the transmission ratio R.

Figure 6:
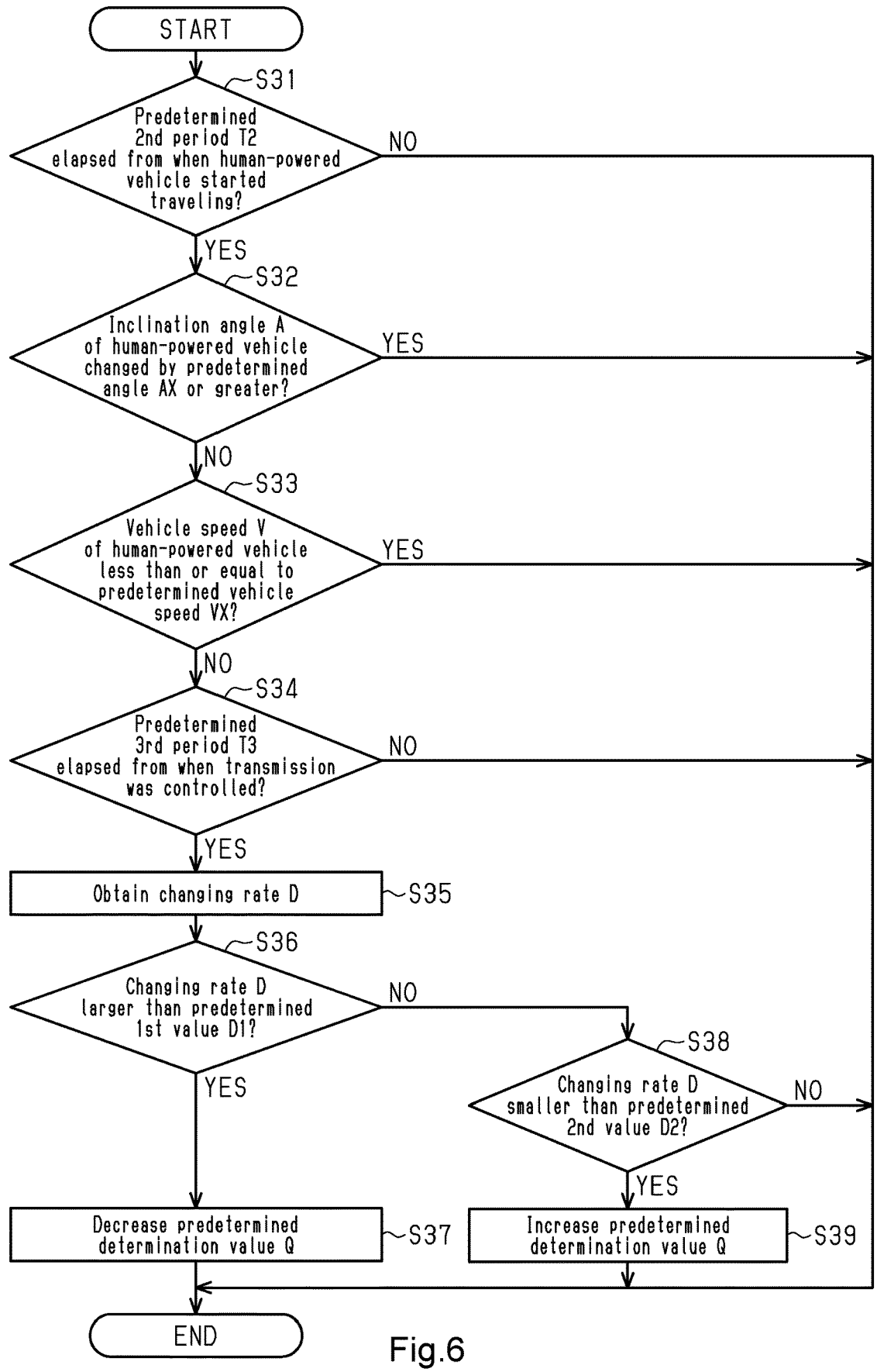
FIG. 6 is a flowchart of a process executed by the electronic controller of FIG. 2 to change the determination value.

A process for changing the determination value Q will now be described with reference to FIG. 6. In a case where the controller 52 is supplied with electric power, the controller 52 starts the process and proceeds to step S31 of the flowchart illustrated in FIG. 6. Upon completion of the flowchart illustrated in FIG. 6, the controller 52 repeats the process from step S31 in predetermined cycles until the supply of electric power is stopped.

In step S31, the controller 52 determines whether the predetermined second period T2 has elapsed from when the human-powered vehicle 10 started traveling. The controller 52 determines that the predetermined second period T2 has elapsed from when the human-powered vehicle 10 started traveling in a case where, for example, the elapsed time from when the vehicle speed V of the human-powered vehicle 10 changed from zero to greater than zero becomes greater than or equal to a predetermined time. The controller 52 determines that the predetermined second period T2 has elapsed from when the human-powered vehicle 10 started traveling in a case where, for example, the rotational angle of the crank 12 from when the crank 12 started rotating becomes greater than or equal to a predetermined angle. The controller 52 ends the process in a case where the predetermined second period T2 has not elapsed from when the human-powered vehicle 10 started traveling. The controller 52 proceeds to step S32 in a case where the predetermined second period T2 has elapsed from when the human-powered vehicle 10 started traveling.

In step S32, the controller 52 determines whether the inclination angle A of the human-powered vehicle 10 has been changed by the predetermined angle AX or greater. The controller 52 determines that the inclination angle A of the human-powered vehicle 10 has been changed by the predetermined angle AX or greater in a case where, for example, the inclination angle A is changed by the predetermined angle AX or greater during a predetermined period. The controller 52 ends the process in a case where the inclination angle A of the human-powered vehicle 10 has been changed by the predetermined angle AX or greater. The controller 52 proceeds to step S33 in a case where the inclination angle A of the human-powered vehicle 10 has not been changed by the predetermined angle AX or greater.

In step S33, the controller 52 determines whether the vehicle speed V of the human-powered vehicle 10 is lower than or equal to the predetermined vehicle speed VX. The controller 52 ends the process in a case where the vehicle speed V of the human-powered vehicle 10 is lower than or equal to the predetermined vehicle speed VX. The controller 52 proceeds to step S34 in a case where the vehicle speed V of the human-powered vehicle 10 is not less than or equal to the vehicle speed VX.

In step S34, the controller 52 determines whether the predetermined third period T3 has elapsed from when the transmission 38 was controlled to change the transmission ratio R. The controller 52 ends the process in a case where the predetermined third period T3 has not elapsed from when the transmission 38 was controlled to change the transmission ratio R. The controller 52 proceeds to step S35 in a case where the predetermined third period T3 has elapsed from when the transmission 38 was controlled to change the transmission ratio R.

In step S35, the controller 52 obtains the changing rate D and then proceeds to step S36. For example, the controller 52 uses the plurality of the parameter P set in step S23 of the flowchart illustrated in FIG. 5 to calculate the variance value of the parameter P. In a case where the changing rate D includes a mean value of the variance values of the plurality of the parameter P detected during the predetermined period TX, the controller 52 obtains the mean value of the variance value of the plurality of the parameter P set in different periods as the changing rate D. The controller 52, for example, obtains the mean value of the variance value of the plurality of the parameter P set in six different periods as the changing rate D.

In step S36, the controller 52 determines whether the changing rate D is larger than the predetermined first value D1. The controller 52 proceeds to step S37 in a case where the changing rate D is greater than the predetermined first value D1. In step S37, the controller 52 decreases the predetermined determination value Q and then ends the process.

In a case where the changing rate D is not greater than the predetermined first value D1 in step S36, the controller 52 proceeds to step S38. In step S38, the controller 52 determines whether the changing rate D is smaller than the predetermined second value D2. The controller 52 proceeds to step S39 in a case where the changing rate D is smaller than the predetermined second value D2. In step S39, the controller 52 increases the predetermined determination value Q and then ends the process. In a case where the changing rate D is not smaller than the predetermined second value D2 in step S38, the controller 52 ends the process.

Modifications

The description related with the above embodiment exemplifies, without any intention to limit, applicable forms of a control device for a human-powered vehicle according to the present disclosure. The control device for a human-powered vehicle according to the present disclosure is applicable to, for example, modifications of the above embodiments that are described below and combinations of at least two of the modifications that do not contradict each other. In the modifications described hereinafter, same reference numerals are given to those components that are the same as the corresponding components of the above embodiment. Such components will not be described in detail.

The controller 52 can be configured to control the transmission 38 to increase the transmission ratio R upon determining the predetermined parameter P is smaller than the first determination value Q1. In a case where the predetermined parameter P is the torque applied to the crank 12 by the human driving force H, preferably, the controller 52 is configured to control the transmission 38 to increase the transmission ratio R if the torque is smaller than the first determination value Q1. In a case where the predetermined parameter P is the inclination angle A, preferably, the controller 52 is configured to control the transmission 38 to increase the transmission ratio R if the torque is smaller than the first determination value Q1.

The controller 52 can be configured to control the transmission 38 to decrease the transmission ratio R upon determining the predetermined parameter P is larger than the second determination value Q2. In a case where the predetermined parameter P is the torque applied to the crank 12 by the human driving force H, preferably, the controller 52 is configured to control the transmission 38 to decrease the transmission ratio R if the torque is larger than the second determination value Q2. In a case where the predetermined parameter P is the inclination angle A, preferably, the controller 52 is configured to control the transmission 38 to decrease the transmission ratio R if the torque is larger than the second determination value Q2.

The changing rate D can be the difference between the maximum value and minimum value of the plurality of the parameter P detected during the predetermined period TX. In sum, the changing rate D can be changed as long as it is a value correlated to a variation in the parameter P.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, the phrase "at least one of" as used in this disclosure means "only one single choice" or "any combination of two or more choices" if the number of its choices is three or more.

What is claimed is:

1. A human-powered vehicle control device for a human-powered vehicle, the human-powered vehicle control device comprising:
   an electronic controller configured to control a transmission that changes a transmission ratio of a rotational speed of a wheel of the human-powered vehicle to a rotational speed of a crank of the human-powered vehicle,
   the electronic controller being configured to control the transmission to change the transmission ratio in accordance with a comparison of a parameter related to at least one of a traveling environment and a traveling state of the human-powered vehicle with a predetermined determination value, and
   the electronic controller being configured to change the predetermined determination value in accordance with a change in the parameter during a single rotation of the crank.

2. The human-powered vehicle control device according to claim 1, wherein
the electronic controller is configured to change the predetermined determination value in accordance with a change in the parameter during a predetermined first period, and
the predetermined first period is shorter than or equal to a period during which the crank rotates one complete revolution.

3. The human-powered vehicle control device according to claim 2, wherein
the electronic controller is configured to change the predetermined determination value in a case where a changing rate of the parameter during the predetermined first period is larger than a predetermined first value.

4. The human-powered vehicle control device according to claim 3, wherein
the electronic controller is configured to change the predetermined determination value upon determining a changing rate of the parameter during the predetermined first period is smaller than a predetermined second value.

5. The human-powered vehicle control device according to claim 4, wherein
the electronic controller is configured to increase the predetermined determination value upon determining the changing rate of the parameter during the predetermined first period is smaller than the predetermined second value.

6. The human-powered vehicle control device according to claim 3, wherein
the electronic controller is configured to decrease the predetermined determination value upon determining the changing rate of the parameter during the predetermined first period is larger than the predetermined first value.

7. The human-powered vehicle control device according to claim 2, wherein
the predetermined determination value includes a first determination value and a second determination value that is larger than the first determination value.

8. The human-powered vehicle control device according to claim 7, wherein
the electronic controller is configured to control the transmission to decrease the transmission ratio upon determining the predetermined parameter is smaller than the first determination value.

9. The human-powered vehicle control device according to claim 7, wherein
the electronic controller is configured to control the transmission to increase the transmission ratio upon determining the predetermined parameter is larger than the second determination value.

10. The human-powered vehicle control device according to claim 2, wherein
the electronic controller is configured to change the predetermined determination value in accordance with a changing rate of the parameter during the predetermined first period.

11. The human-powered vehicle control device according to claim 2, wherein
a changing rate of the parameter during the predetermined first period includes a variance value of a plurality of the parameter detected during the predetermined period.

12. The human-powered vehicle control device according to claim 1, wherein
the electronic controller is configured not to change the predetermined determination value in accordance with a changing rate of the predetermined parameter upon determining a predetermined second period has not elapsed from when the human-powered vehicle started traveling.

13. The human-powered vehicle control device according to claim 1, wherein
the electronic controller is configured not to change the predetermined determination value in accordance with a changing rate of the predetermined parameter upon determining an inclination angle of the human-powered vehicle is changed by a predetermined angle or greater.

14. The human-powered vehicle control device according to claim 1, wherein
the electronic controller is configured not to change the predetermined determination value in accordance with a changing rate of the predetermined parameter upon determining a vehicle speed of the human-powered vehicle is less than or equal to a predetermined vehicle speed.

15. The human-powered vehicle control device according to claim 1, wherein
the electronic controller is configured not to change the predetermined determination value in accordance with a changing rate of the predetermined parameter upon determining a predetermined third period has not elapsed from when the transmission was controlled to change the transmission ratio.

16. The human-powered vehicle control device according to claim 1, wherein
the parameter includes a rotational speed of the crank.

17. A human-powered vehicle control device for a human-powered vehicle, the human-powered vehicle control device comprising:
an electronic controller configured to control a transmission that changes a transmission ratio of a rotational speed of a wheel of the human-powered vehicle to a rotational speed of a crank of the human-powered vehicle,
the electronic controller being configured to control the transmission to change the transmission ratio in accordance with a comparison of a parameter related to at least one of a traveling environment and a traveling state of the human-powered vehicle with a predetermined determination value, and
the electronic controller being configured to change the predetermined determination value upon determining a changing rate of the parameter during a predetermined first period is larger than a predetermined first value.

* * * * *